US008825017B2

(12) United States Patent
Skelton et al.

(10) Patent No.: US 8,825,017 B2
(45) Date of Patent: Sep. 2, 2014

(54) METHOD AND SYSTEM FOR DUAL-NETWORK TELEPHONE CALLING

(75) Inventors: Jeffrey Skelton, Perrineville, NJ (US); Binyamin Bauman, Passaic, NJ (US)

(73) Assignee: Net2Phone, Inc., Newark, NJ (US)

( * ) Notice: Subject to any disclaimer, the term of this patent is extended or adjusted under 35 U.S.C. 154(b) by 487 days.

(21) Appl. No.: 12/603,461

(22) Filed: Oct. 21, 2009

(65) Prior Publication Data

US 2011/0092192 A1 Apr. 21, 2011

(51) Int. Cl.
| | |
|---|---|
| H04M 3/42 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ........................................ 455/414.1; 370/252

(58) Field of Classification Search
USPC ................................................. 455/417, 418
See application file for complete search history.

(56) References Cited

U.S. PATENT DOCUMENTS

| 5,845,205 | A | 12/1998 | Alanara et al. |
| 6,931,249 | B2 | 8/2005 | Fors et al. |
| 7,130,827 | B2 | 10/2006 | Kiser |
| 7,525,950 | B1 | 4/2009 | Zhang |
| 7,676,229 | B2 * | 3/2010 | Albina et al. ................. 455/445 |
| 2001/0036255 | A1 | 11/2001 | Reformato et al. |
| 2001/0047333 | A1 * | 11/2001 | Kim et al. ........................ 705/40 |
| 2007/0087753 | A1 * | 4/2007 | Rosenblatt et al. ........... 455/445 |
| 2007/0183339 | A1 * | 8/2007 | Rousell et al. ................ 370/252 |
| 2008/0261603 | A1 | 10/2008 | Sever et al. |
| 2010/0048191 | A1 * | 2/2010 | Bender et al. ................. 455/416 |
| 2010/0088419 | A1 * | 4/2010 | Phelps et al. .................. 709/228 |
| 2011/0013763 | A1 * | 1/2011 | Dube ............................ 379/189 |

OTHER PUBLICATIONS

U.S. Appl. No. 12/916,703, filed Dec. 28, 2012 PTO Office Action.

* cited by examiner

Primary Examiner — Kent Chang
Assistant Examiner — Nathan Brittingham
(74) Attorney, Agent, or Firm — Davidson Berquist Jackson & Gowdey, LLP

(57) ABSTRACT

Methods and systems are provided to connect telephone calls, such as international phone calls, using both the data network and telephone network of a mobile communication device such as a cellular phone. These systems initially route a call to the destination phone number through a non-international temporary phone number, thereby saving the cost of an international phone call on the mobile phone's service plan. An application on the mobile phone uses the data network to automatically request and receive the substitute termination number, and automatically sets up a call on the telephone network to the substitute termination number, which routes the call to the desired international telephone number. These systems reduce the cost of an international call, permit mobile phone users without international calling plans to make international calls, and automatically connect to an international number through a temporary non-international number using dual networks.

16 Claims, 3 Drawing Sheets

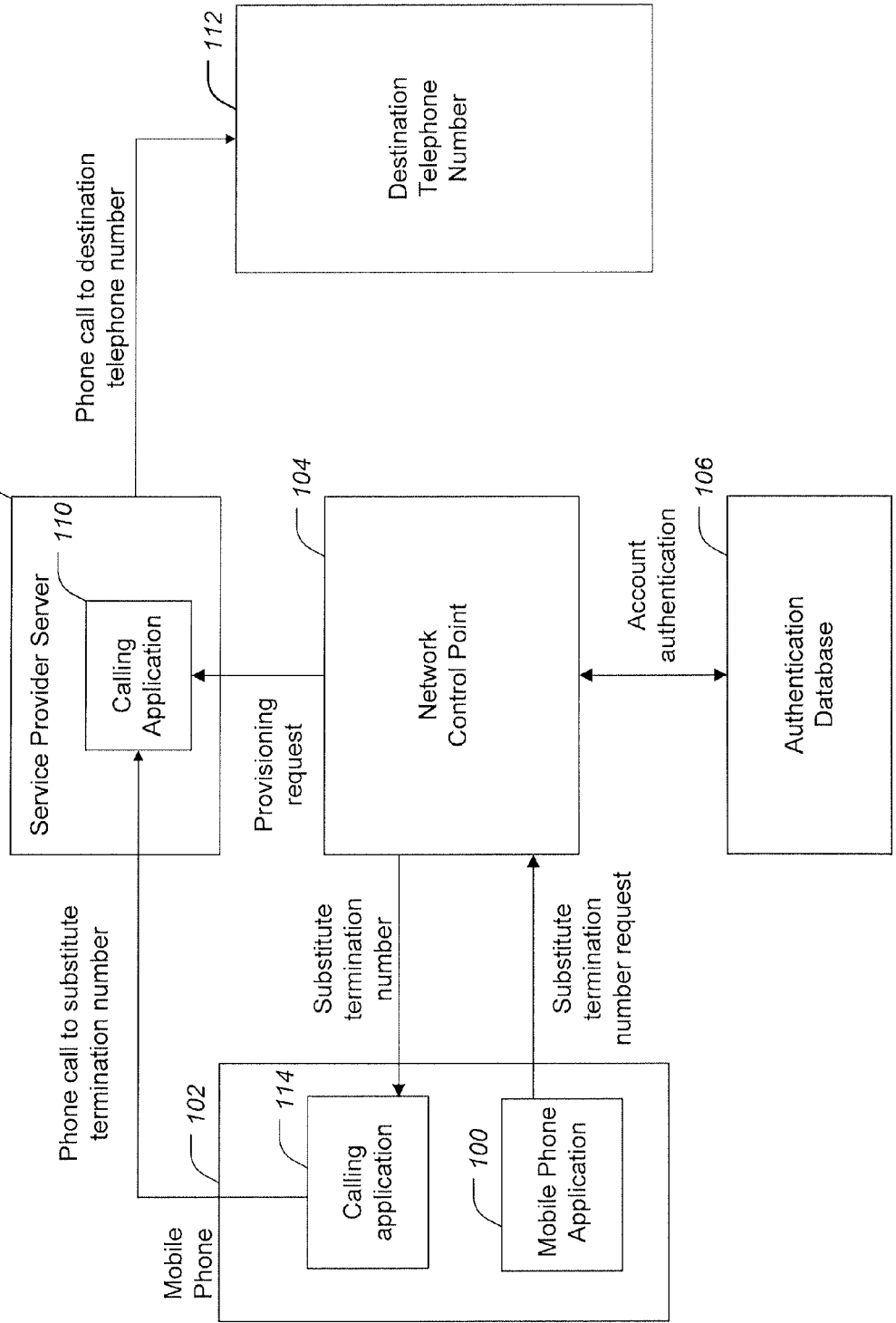

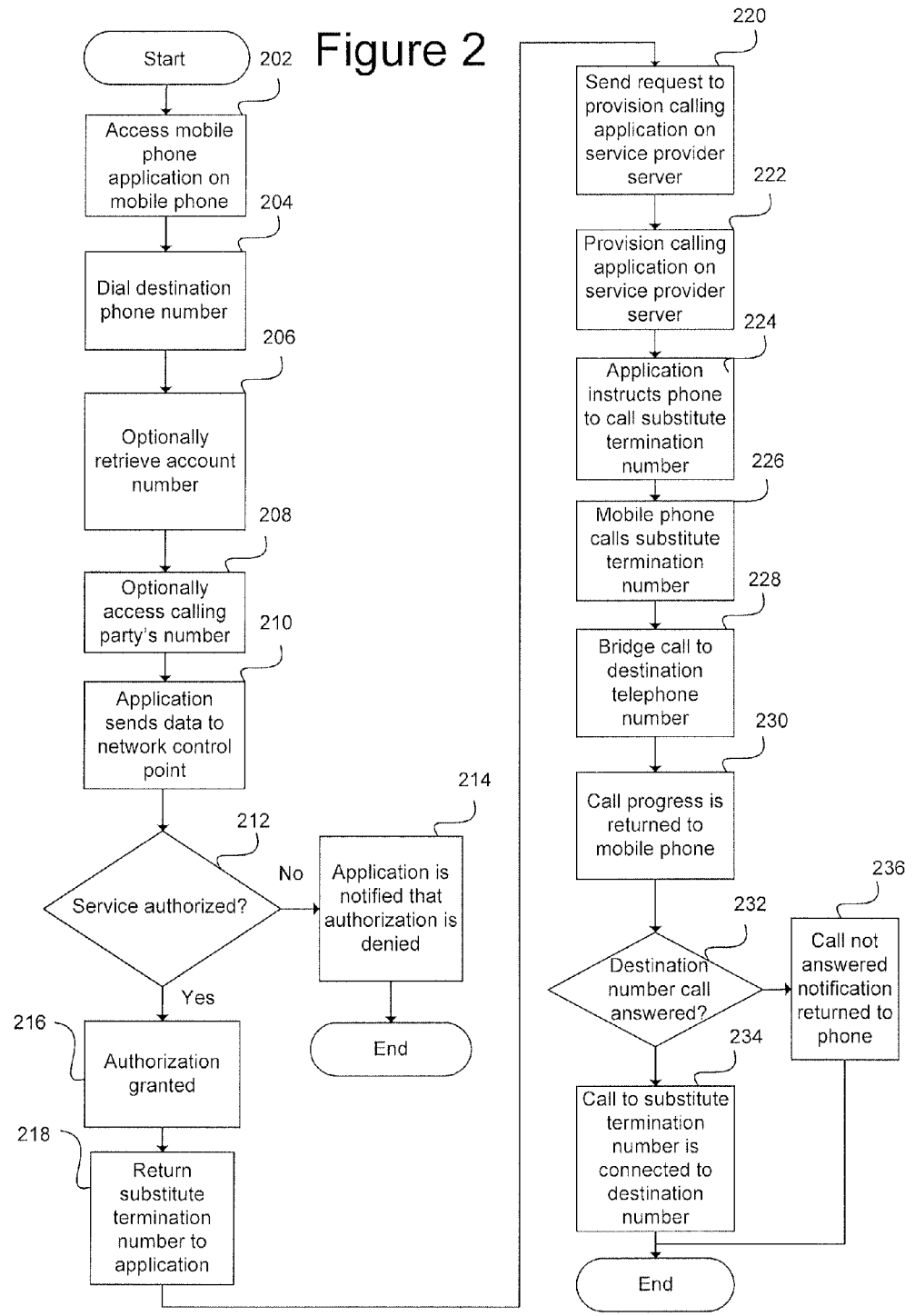

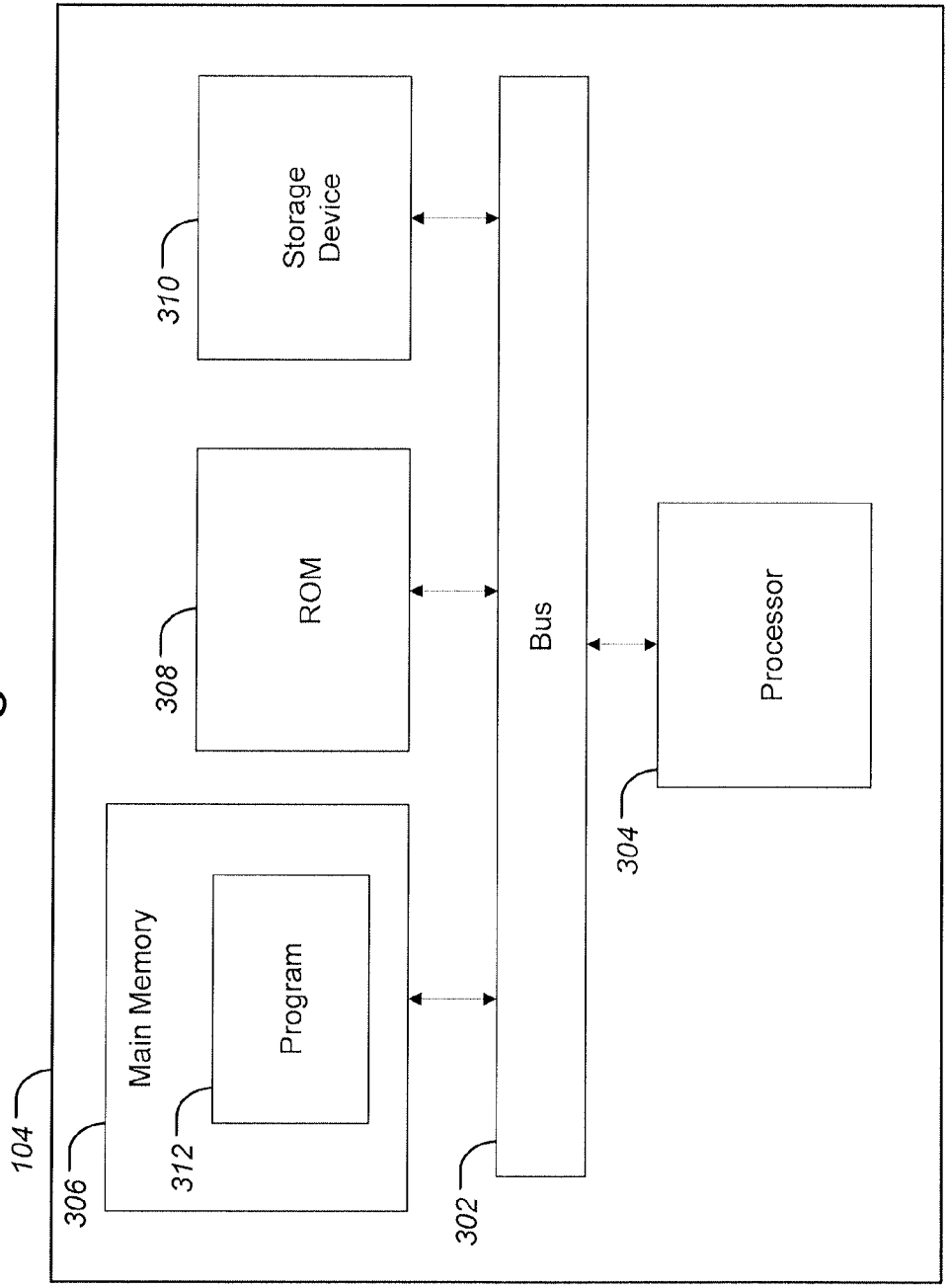

METHOD AND SYSTEM FOR DUAL-NETWORK TELEPHONE CALLING

This generally relates to telephony, and more particularly to an application on a mobile device for connecting a telephone call using a data network and a telephone network.

BACKGROUND

Mobile telephones have become significantly more common in recent times and provide increasingly advanced technology and functionality. These phones provide convenient communication for users around the world. However, mobile phones can have expensive and/or complicated billing plans for charging the users.

Many mobile telephone plans do not charge the caller extra for dialing locally or even anywhere inside the caller's country. Many users do not have international calling activated or available on their mobile phone plans, and cannot make international phone calls from their phones. Even those mobile telephone users that do have international calling activated on their phones may incur expensive charges for each individual international or long distance telephone call.

Telephone calling cards may provide a convenient way for business, residential and mobile telephone users to charge the costs of telecommunications services separate from their phone service plans. Conventional voice calling card services may be used to reduce communication costs and manage call accounting records. As the landscape of telecommunications changes, retail pre-paid calling cards have become popular in some markets, especially for international calling. One reason for this popularity is due to significantly higher long distance calling rates for international calls when compared to national long distance calling rates for private subscriber accounts.

However, these cards typically require a user to call a phone number and then enter a separate calling card code number as well as the destination phone number. Upon validation of the calling card code number, a connection between the subscriber and the called party is established. Notably, they do not permit automatic dialing without the added delay and inconvenience of entering multiple sets of numbers. Accordingly, there is a desire for a method and system to permit easy, efficient and automatic long-distance or international calling, avoid the full cost of these calls, and provide flexibility in paying for the service.

SUMMARY

In accordance with methods and systems consistent with the present invention, a method in a data processing system is provided for placing a telephone call, comprising receiving a destination phone number to call, and automatically sending a request for a substitute termination phone number over a data network in response to receiving the destination phone number. The method further comprises receiving the requested substitute termination phone number over the data network, calling the substitute termination phone number over a telephone network, and connecting to the destination phone number via the substitute termination number over the telephone network.

In one implementation, a mobile communication device configured to make phone calls is provided comprising a memory storing an application configured to cause the mobile communication device to receive a destination phone number to call. The application is further configured to cause the mobile communication device to automatically send a request for a substitute termination phone number over a data network in response to receiving the destination phone number, and receive the requested substitute termination phone number over the data network. The application is further configured to cause the mobile communication device to call the substitute termination phone number over a telephone network, and connect to the destination phone number via the substitute termination number over the telephone network. The mobile communication device further comprises a processor to run the application.

In another implementation, a data processing system for processing phone calls is provided comprising a mobile communication device configured to make phone calls comprising a memory. The memory stores an application configured to cause the mobile communication device to receive a destination phone number to call, and automatically send a request for a substitute termination phone number over a data network in response to receiving the destination phone number. The application is further configured to cause the mobile communication device to receive the requested substitute termination phone number over the data network, call the substitute termination phone number over a telephone network, and connect to the destination phone number via the substitute termination number over the telephone network. The mobile communication device further comprises a processor to run the application. The data processing system further comprises a network control point server configured to receive the request for the substitute termination phone number over the data network and authorize service in response, and send a request to configure a service provider server to receive the call to the substitute termination phone number and to bridge the received phone call to the destination phone number. The data processing system further comprises the service provider server configured to receive the request to configure the service provider server and configure the service provider server in response, wherein the configuration of the service provider server expires after a predetermined amount of time. The service provider server is further configured to receive the call to the substitute termination phone number and call the destination phone number. The service provider server is additionally configured to return an indication of progress of the received call before the call to the destination phone number is answered, and bridge the call from the substitute termination phone number to the destination phone number.

BRIEF DESCRIPTION OF THE DRAWINGS

FIG. 1 illustrates a mobile phone, data network and telephone network in accordance methods and systems consistent with the present invention.

FIG. 2 depicts a network control point server in accordance with methods and systems consistent with the present invention.

FIG. 3 depicts a flowchart illustrating steps in a method using a substitute termination number in accordance with methods and systems consistent with the present invention.

DETAILED DESCRIPTION

Many modern mobile phones, PDA's, smart phones and other mobile communication devices have data capabilities and access data networks in addition to their regular calling capabilities over telephone networks. Methods and systems in accordance with the present invention connect telephone calls, such as international phone calls, using both the data network and the telephone network of a mobile device. These methods and systems initially route a call to the destination phone number through a non-international temporary phone number, thereby saving the cost of an international phone call on the mobile phone plan associated with the mobile phone. In one implementation, an application on the mobile phone uses the data network to automatically request and receive the temporary phone number (herein referred to as the substitute termination number), and the application automatically sets up a call on the telephone network to the substitute termination number, which in turn routes the call to the desired international telephone number.

The routing of the call through a temporary non-international number provides the capability of international calling to mobile users that do not have a mobile phone service plan that includes international calling. It also provides for less expensive international calling due to the ability to purchase international minutes in bulk at wholesale rates at the substitute termination number that are therefore likely cheaper than the international rates charged individually on a typical mobile phone service plan. Thus, the mobile phone application that runs on the mobile phone emulates single-stage dialing using a calling card-like system, thus providing the user experience of single-stage dialing while providing the advantages of a calling card for international calls. Since many callers do not have different rates for calling within a country, e.g., the U.S., the user of the substitute termination number realizes the advantage of using non-international minutes on their calling plan to call the substitute termination number from anywhere in the country for the same non-international price.

Methods and systems in accordance with the present invention provide a way to avoid the full cost of an international call, permit mobile phone users without international calling plans to make international calls, and automatically connect to an international destination number through a temporary non-international number using dual networks, i.e., data and telephone, to set up the call. Additionally, since the call does not incur additional charges on a typical mobile plan, the international portion of the call may be billed to a separate account, thereby providing flexibility for funding the account. For example, the user may prepay the account via any suitable method, receive a bill, charge it to a credit card, avoid monthly bills from their mobile phone company, and/or share funding of the account. The use of the data network to automatically set up the connection to the substitute termination number permits connection of the call without the user needing to enter additional information besides the destination telephone number.

The mobile communication device, such as a cellular phone, PDA, smart phone or other suitable device, includes an application that runs on the device, such as an iPhone application running on an Apple iPhone. The application may set up calls in conjunction with a calling card product such as PennyTalk, for example. The application sets up telephone calls using the dual-network device, including a data network and a telephony network (which may be Voice over Internet Protocol (VoIP), wired public switched telephone network (PSTN) or wireless telephone network, for example.)

Generally, the mobile phone application receives the desired international destination phone number from the user, exchanges data with a network control point which provides a means to set up the desired telephone call. To receive the destination number from the user, the mobile phone application may present a user interface that resembles a telephone calling application or interface. Upon receipt, the mobile phone application supplies the destination phone number and optionally the calling party's number (CPN) and an account number to the network control point over the data network. The network control point returns a substitute termination phone number (STN) over the data network to the mobile phone application, and also signals the service provider's server (on the service provider's telephone network) hosting the STN to provision a calling application to be prepared for the receipt of a phone call to the substitute termination phone number. The mobile phone application then relays the STN to the phone calling application on the mobile phone that dials regular phone calls. In response, the phone calling application dials the STN over the telephone network. Upon receipt of the call by the STN, the service provider calling application dials the international number, and upon answering, bridges the call to connect the mobile phone to the international destination number.

FIG. 1 illustrates a mobile phone, a data network and a telephone network in accordance methods and systems consistent with the present invention. FIG. 2 depicts steps in an exemplary method for placing a phone call using these dual networks (data and telephone) in accordance with an embodiment consistent with the present invention, and is discussed below in conjunction with FIG. 1. First, a mobile phone user accesses the mobile phone application 100 on the mobile phone 102 (step 202). In one embodiment, the mobile phone application 100 may be a mobile phone software application, such as in iPhone application, and may run on the mobile phone 102 having a processor that runs the software application. It may also be a hardware component or any combination of hardware or software. Additionally, the phone 102 may be a mobile phone or non-mobile phone such as a residential landline telephone, or any other suitable communication device.

The mobile phone application 100 may present an interface for the user to enter the desired international destination telephone number (TN) 112. In other implementations, the mobile phone application 100 may work with a peripheral device that presents a physical telephone keypad to the user, or may receive the phone number via the telephone keypad on the mobile phone 102. The mobile phone application 100 may use either this keypad or the calling application user interface (such as a soft keypad) to collect the TN 112 from the user. The user dials the TN 112 on the keypad (step 204). The mobile phone application 100 may use an address book, contact list, voice recognition or some other method of allowing the user to select a TN 112 without entering the digits on the keypad. Although typically described as being an international phone call, the call destination 112 can be anywhere including international, national or local call destinations. The TN 112 may represent a communication device and/or a server on a service provider network hosting the destination telephone number.

In one implementation, in addition to the destination phone number 112, the mobile phone application 100 may request and/or require a user identifier such as an account number that can be validated, authenticated, and billed by the network control point (step 206). The account number may be used to associate the user with an account for the purposes of billing and may have, for example, a prepaid balance. The account number may be stored on the mobile phone 102. The mobile phone application 100 may provide service without a user identifier, whereas some other accounting and billing arrangement may exist. Additionally, the mobile phone application 100 optionally accesses the CPN (step 208). The mobile phone application 100 may use the CPN from the mobile phone 102 as a means to restrict or control some aspects of usage of the mobile phone application 100 at the network control point. For example, the calling application 110 provisioned to run on the STN may only allow usage when the call is signaled to have been placed from the CPN.

The mobile phone application 100 then sends the data including, for example, the TN 112, CPN, and account number to the network control point 104 over the data network (step 210). Upon receipt of the data from the mobile phone application 100, the network control point 104 validates the account number to authorize service (step 212). In doing so, the network control point 104 accesses an authentication database 106 that may be located remotely. If authentication is denied, the network control point 104 notifies the mobile phone application (step 214). If authentication is granted (step 216), the network control point 104 returns a STN to the mobile phone application 100 for call signaling and bridging to the destination telephone number 112 (step 218).

The network control point 104 also sends a request to a service provider server 108 having the STN to provision a calling application 110 on the server to prepare for an incoming call (step 220). From the information gathered at and received from the network control point 104, the service provider server 108 hosting the STN provisions the calling application 110 hosted on the server to expect an inbound call request and, when that call arrives, to bridge the call to the TN 112 (step 222). The provisioning may include inserting the relevant data into a database table and being prepared to run a call bridging application to the telephone number TN 112. Generally, the service provider's network provides an infrastructure for the telephone network, and the service provider servers 108 run call control applications to control telephone calls.

FIG. 3 depicts an exemplary network control point server in accordance with methods and systems consistent with the present invention. The network control point 104 may be a server, computer or any other suitable device accepting and sending data packets over a network. Other components described herein, such as the service provider server 108, authentication database 106 and destination telephone number server 112 may have the same or similar components as described below. The mobile phone 102 may also have components that operate similarly but on a smaller scale. Additionally, there may be many more network control points 104, service provider servers 108, mobile phones 102, authentication databases 106 or any other components than are shown on FIG. 1.

In one implementation, the network control point 104 includes a bus 302 or other communication mechanism for communicating information, and a processor 304 coupled with bus 302 for processing the information. The network control point 104 also includes a main memory 306, such as a random access memory (RAM) or other dynamic storage device, coupled to the bus 302 for storing information and instructions to be executed by the processor 304. In addition, the main memory 306 may be used for storing temporary variables or other intermediate information during execution of instructions to be executed by processor 304. The main memory 306 includes a program 312 for implementing processing consistent with methods and systems in accordance with the present invention. The network control point 104 further includes a Read-Only Memory (ROM) 308 or other static storage device coupled to the bus 302 for storing static information and instructions for the processor 304. A storage device 310, such as a magnetic disk or optical disk, is provided and coupled to bus 302 for storing information and instructions.

According to one embodiment, the processor 304 executes one or more sequences of one or more instructions contained in the main memory 306. Such instructions may be read into the main memory 306 from another computer-readable medium, such as the storage device 310. Execution of the sequences of instructions in the main memory 306 causes the processor 304 to perform processes described herein. One or more processors in a multi-processing arrangement may also be employed to execute the sequences of instructions contained in the main memory 306. In alternative embodiments, hard-wired circuitry may be used in place of or in combination with software instructions. Thus, embodiments are not limited to any specific combination of hardware circuitry and software.

Although described relative to the main memory 306 and the storage device 310, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Referring back to FIG. 2, upon receipt of the STN from the network control point 104, the mobile phone application 100 instructs the local mobile telephone 102 to place a call to the STN over the PTSN network (step 224). In doing so, the mobile phone application 100 may use the regular calling application 114 or functionality of the mobile phone 102. This calling application 114 may be hardware or software or a combination of both. When the local mobile phone 102 calls the STN (step 226), the call routes to the server 108 of the service provider providing the STN. The service provider server 108 includes the calling application 110 that has been provisioned to be prepared for the incoming call. When the call request signaling for the call to the STN arrives at the service provider application, the service provider application 110 initiates a call to the TN 112 by generating call setup signaling (step 228).

The service provider application 110 bridges call progress information from the TN call setup to the STN call setup log. This replicates call progress information—such as signaling that indicates the phone is ringing—received by the service provider application 110 setting up the call to the TN 112 back to the mobile phone 102. Call progress information, e.g., the phone is ringing, may be given back to the mobile telephone 102 while the call to the TN 112 is in progress (step 230). In one implementation, the service provider server application 110 does not answer the first call received from the mobile telephone 102 until the second call to the TN 112 is answered. If the call to the TN 112 completes (step 232), the service provider application completes the STN call (step 234) and signals the bridging of the bearer channel to the mobile phone 102. During the call, the call connection stays routed through the service provider server 108 on which the service provider application 110 resides. If the call to the TN 112 does not complete (step 232), the service provider application terminates the STN call (step 236) and signals the termination with the cause code of the TN call.

Various implementations and variations may be used. In one implementation, the service provider provisioning of the calling application 110 on the STN from the network control point information is temporary, and the provisioning expires after a short period of time. In addition, the STN may use the CPN from the call into the STN as validation criteria checked against the calling party number information delivered in the network control point's signaling to the STN. In another implementation, the STN may be toll-free or non-toll-free.

Toll-free numbers are more likely to receive the CPN and provide no impact on the end-user's service plan or billing plan.

Furthermore, the selection of a best STN to use may involve value-oriented algorithms and processes that may use information such as the CPN, the account number, time of day, location, and TN destination 112. For example, a STN local to the caller may be selected. Additionally, the call to the STN may be a Voice-over IP (VoIP) call or a PSTN call from the mobile phone 102. In another embodiment, the call to the TN 112 may be a VoIP call or a PSTN call from the service provider.

Another implementation in accordance with the present invention involves the use of a durable intermediary phone number as opposed to a temporary one. In this embodiment, the calling process is similar to the above process, except that the STN is replaced with a durable substitute termination number (DSTN). In this example, the provisioning of the application on the service provider server having the DSTN is not temporary; it is durable. The DSTN is retained by the mobile phone application for use in future calls to the destination telephone number 112. In one implementation, the use of the DSTN requires the CPN for the service provider server 108 to distinguish between different callers, and access to the calling application 110 at the service provider server 108 uses the CPN for validation. In this implementation, original or subsequent calls using the DSTN are made directly to the DSTN without set up through the network control point 104. The process may be similar to the process described in FIG. 2, except, in one implementation, skipping from step 204 to step 226 on calls subsequent to the first call.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A method in a data processing system for placing a telephone call, comprising:
controlling a mobile communication device to perform the steps of:
receiving a destination phone number to call;
automatically sending a request for a substitute termination phone number over a data network in response to receiving the destination phone number;
receiving the requested substitute termination phone number over the data network;
calling the substitute termination phone number over a telephone network;
receiving over the telephone network, via the call to the substitute termination phone number, an indication of a progress of a call from a bridge to the destination phone number after calling the substitute termination phone number over the telephone network but prior to the call to the substitute termination phone number being answered; and
connecting to the destination phone number by bridging the call to the substitute termination phone number over the telephone network with the call from the bridge to the destination phone number when the call to the destination phone number is answered.

2. The method of claim 1, further comprising receiving the request for the substitute termination phone number over the data network and authorizing service in response.

3. The method of claim 1, wherein the automatically sending a request further comprises sending a calling party number with the request for the substitute termination phone number.

4. The method of claim 3, wherein the automatically sending a request further comprises sending an account number associated with a user.

5. The method of claim 1, further comprising sending a request to configure a service provider server to receive a phone call to the substitute termination phone number.

6. The method of claim 5, further comprising receiving the request to configure the service provider server and configuring the service provider server in response.

7. The method of claim 6, wherein the configuration of the service provider server expires after a predetermined amount of time.

8. The method of claim 1, wherein the substitute termination phone number is a toll-free phone number.

9. The method of claim 1, further comprising:
receiving the request for a substitute termination phone number; and
selecting the substitute termination phone number based on one or more of: (1) a calling party number, (2) an account number, (3) a time, (4) a location, and (5) a destination phone number.

10. A mobile communication device configured to make phone calls, comprising:
a memory storing an application configured to cause the mobile communication device to:
receive a destination phone number to call;
automatically send a request for a substitute termination phone number over a data network in response to receiving the destination phone number;
receive the requested substitute termination phone number over the data network;
call the substitute termination phone number over a telephone network;
receive over the telephone network, via the call to the substitute termination phone number, an indication of a progress of a call from a bridge to the destination phone number after calling the substitute termination phone number over the telephone network but prior to the call to the substitute termination phone number being answered; and
connect to the destination phone number by bridging the call to the substitute termination phone number over the telephone network with the call from the bridge to the destination phone number when the call to the destination phone number is answered; and
a processor to run the application.

11. The mobile communication device of claim 1, wherein the application is further configured to cause the mobile communication device to receive an indication of authorization of service.

12. The mobile communication device of claim 1, wherein the automatically sending a request further comprises sending a calling party number with the request for the substitute termination phone number.

13. The mobile communication device of claim 12, wherein the automatically sending a request further comprises sending an account number associated with a user.

14. The mobile communication device of claim 1, wherein the substitute termination phone number is a toll-free phone number.

15. The mobile communication device of claim 1, wherein the substitute termination phone number is selected based on one or more of: (1) a calling party number, (2) an account number, (3) a time, (4) a location, and (5) a destination phone number.

16. A data processing system for processing phone calls comprising:
- a mobile communication device configured to make phone calls, comprising:
  - a memory storing an application configured to cause the mobile communication device to:
  - receive a destination phone number to call;
  - automatically send a request for a substitute termination phone number over a data network in response to receiving the destination phone number;
  - receive the requested substitute termination phone number over the data network;
  - call the substitute termination phone number over a telephone network;
  - receive over the telephone network, via the call to the substitute termination phone number, an indication of a progress of a call from a bridge to the destination phone number after calling the substitute termination phone number over the telephone network but prior to the call to the substitute termination phone number being answered; and
  - connect to the destination phone number by bridging the call to the substitute termination phone number over the telephone network with the call from the bridge to the destination phone number when the call to the destination phone number is answered; and
  - a processor to run the application; and
- a network control point server configured to:
  - receive the request for the substitute termination phone number over the data network and authorize service in response; and
  - send a request to configure a service provider server to receive the call to the substitute termination phone; and
- the service provider server configured to:
  - receive the request to configure the service provider server and configure the service provider server in response, wherein the configuration of the service provider server expires after a predetermined amount of time;
  - receive the call to the substitute termination phone number;
  - call the destination phone number;
  - return, across the telephone network that received the call to the substitute termination phone number, the indication of the progress of the call from the bridge to the destination phone number after receiving the call to the substitute termination phone number but prior to the call to the substitute termination phone number being answered; and
  - bridge the call from the substitute termination phone number to the destination phone number when the call to the destination phone number is answered.

* * * * *